United States Patent [19]

Nilsen

[11] 4,357,500

[45] Nov. 2, 1982

[54] TELEPHONE HANDSET CORD ANTI-TWIST ACCESSORY

[76] Inventor: Robert J. Nilsen, Colonia, N.J.

[21] Appl. No.: 191,323

[22] Filed: Sep. 26, 1980

[51] Int. Cl.³ .......................... H04M 1/15; H01B 7/06
[52] U.S. Cl. ...................................... 179/184; 174/69; 191/12 R
[58] Field of Search ................... 179/154, 184; 174/69; 191/12 R, 12 S; 248/544, 551, 552

[56] References Cited

U.S. PATENT DOCUMENTS

| | | | |
|---|---|---|---|
| 1,730,945 | 10/1929 | Poole | 174/69 |
| 2,191,011 | 2/1940 | Dorman | 191/12 S |
| 2,206,703 | 7/1940 | Lowe | 171/12 R |
| 2,281,542 | 5/1942 | Barrans et al. | 174/69 |
| 2,452,431 | 10/1948 | Collins et al. | 174/69 |
| 2,587,707 | 3/1952 | Dever | 191/12 R |
| 2,795,641 | 6/1957 | Rowell | 174/69 |
| 2,880,992 | 4/1959 | Gubernick | 174/69 |

FOREIGN PATENT DOCUMENTS

| | | | |
|---|---|---|---|
| 416011 | 9/1934 | United Kingdom | 174/69 |
| 676980 | 8/1952 | United Kingdom | 174/69 |

*Primary Examiner*—George G. Stellar

[57] ABSTRACT

The device is an accessory attachment which prevents twisting and entanglement of the commonly used helical extensible telephone cords which connect the telephone handset to the main telephone or base. The device is a somewhat flexible elongate member centrally positioned within the cord and attached to the opposite ends of the cord.

7 Claims, 4 Drawing Figures

TELEPHONE HANDSET CORD ANTI-TWIST ACCESSORY

BACKGROUND OF THE INVENTION

The well known circular flexed helical extensible telephone cord, although highly functional, can be and oftentimes is a source of extreme consumer annoyance because after repeated use it becomes twisted are tangled and therefore becomes less functional because it loses its flexibility.

The object of the invention is to prevent these occurrances.

BRIEF DESCRIPTION OF THE DRAWING FIGURES

DETAILED DESCRIPTION OF THE INVENTION

Figure 1:
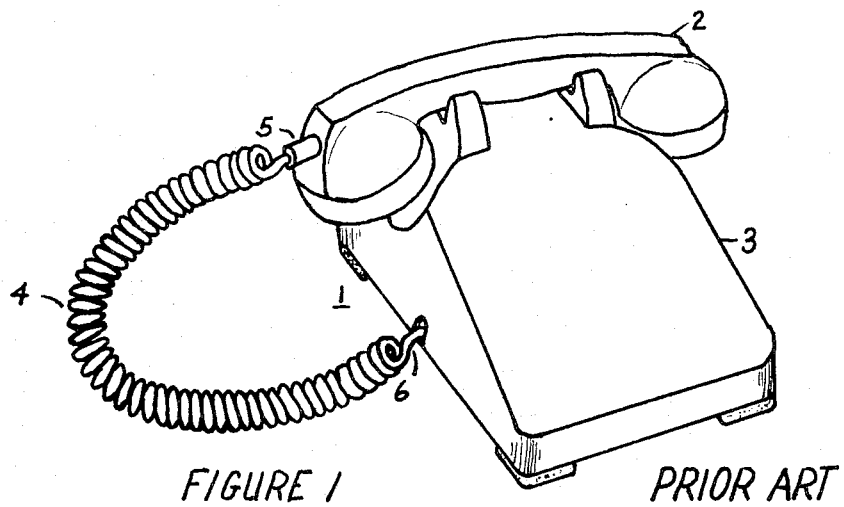
FIG. 1 shows the known standard type desk telephone, to which the invention may be applied.

FIG. 1 shows the known standard type desk telephone to which the invention may be applied. The telephone 1 comprises a handset 2 and a telephone base 3. Connected therebetween is the common circular flexed helical extensible electrical telephone cord 4 having a handset end 5 and a telephone base end 6. Although only the known standard type desk telephone has been illustrated, it is intended that the invention is for use on any and all telephones which utilize the standard type circular flexed helical extensible cord between the handset and the telephone base as the problem remains the same.

Figure 2:
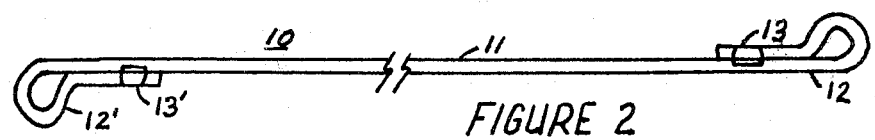
FIG. 2 shows the device of the invention.

FIG. 2 shows the device of the invention 10. It is a straight thin flexible elongate member having a main body portion 11 whose opposite ends 12,12' are structured to provide attachment to the helical extensible cord. The attachment is by a loop and snap 13,13'. The device is a cylindrical, tubular structure made of a plastic, vinyl or similar suitable substance of appropriate flexibility. A range of lengths, widths, colors and flexibility is possible. Varying lengths, widths and colors may be made to accomodate the varying lengths of the helical extensible telephone cords which are currently in use or provided for use in the future. The length and width is substantially determined by the helical extensible telephone cord with which it is to be used. The upper limit of the width would be the diameter of the circular flexed helical extensible telephone cord which it is intended to accomodate.

Figure 3:
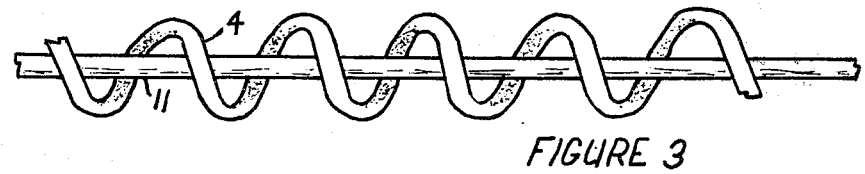
FIG. 3 shows a central fragment of the device of the invention positioned in use in relation to the telephone cord.
Figure 4:
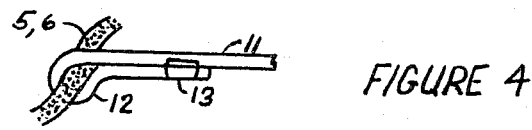
FIG. 4 shows an end fragment of the device of the invention positioned in use and attached to the telephone cord.

As shown in FIG. 3, the device is placed in the central hollow region of the telephone cord. The opposite ends of the device are connected to the opposite ends of the telephone cord, that is the handset end 5 and the telephone base end 6. The connection or attachment is by means of a simple "snap-on" mechanism as shown in FIG. 4, which is currently utilized in pants, shirts and the like. The "snap-on" connection is convenient because it is removable for adjustment at any time, and the device can be put on or taken off by the consumer by merely connecting or disconnecting the "snap-on" mechanism to the circular flexed telephone cord ends.

As a result of its positioning in relationship to helical extensible telephone handset cord, the device will prevent twisting and entanglement of the cord, thereby decreasing consumer annoyance while increasing the functional flexibility of the cord.

What is claimed is:

1. A telephone accessory attachment device to prevent twisting and entanglement of circular flexed helical extensible electrical telephone handset cords due to its construction and positioning in relationship to said cord comprising: a somewhat flexible elongate member having a length determined by the length of said circular flexed helical extensible electrical telephone handset cord and having a width which is less than the diameter of said cord and having, at opposite ends thereof, means for attachment to said cord; said member to be situated within the central hollow region of said cord and said means for attachment to be attached to said cord at the handset end thereof and at the opposite main telephone base end thereof; said device being constructed such that when so attached to said cord twisting and entanglement of said cord will be prevented.

2. A telephone accessory attachment device of claim 1 wherein said device is constructed of a flexible plastic material.

3. A telephone accessory attachment device of claim 1 wherein said flexible plastic material is vinyl.

4. A telephone accessory attachment device of claim 1 wherein said means for attachment are of the "snap-on" variety permitting ready connection and disconnection.

5. A telephone accessory attachment device of claim 1 wherein said device is straight and thin.

6. A telephone accessory attachment device of claim 1 wherein said device is cylindrical tubular shaped.

7. A telephone accessory attachment device of claim 1 wherein said device is constructed of a flexible plastic vinyl material, and said means for attachment are of the "snap-on" variety permitting ready connection and disconnection, and said device is straight and thin.

* * * * *